United States Patent [19]

Ishii et al.

[11] Patent Number: 5,220,615
[45] Date of Patent: Jun. 15, 1993

[54] APPARATUS FOR AND METHOD OF HOUGH-CONVERTING COORDINATE DATA

[75] Inventors: Jun Ishii; Hiroshi Hasegawa, both of Wako, Japan

[73] Assignee: Honda Giken Kogyo Kabushiki Kaisha, Tokyo, Japan

[21] Appl. No.: 632,062

[22] Filed: Dec. 21, 1990

[30] Foreign Application Priority Data

Dec. 27, 1989 [JP] Japan .................. 1-344146

[51] Int. Cl.$^5$ .................. G06K 9/34; G06K 9/48; G06K 9/36; G06F 15/336
[52] U.S. Cl. .................. 382/1; 382/9; 382/22; 382/41; 382/43; 364/728.02; 364/725
[58] Field of Search .................. 382/1, 9, 41, 43; 364/413.2, 576, 725, 728.02

[56] References Cited

PUBLICATIONS

Mano, Morris M., *Computer System Architecture*, Prentice-Hall, 1982.

Primary Examiner—David K. Moore
Assistant Examiner—Michael Cammarata
Attorney, Agent, or Firm—Lyon & Lyon

[57] ABSTRACT

Disclosed herein is an apparatus for and a method of Hough-converting coordinate data in a rectangular coordinate system. The apparatus includes circulating means for receiving prescribed data corresponding to the coordinate data therein so as to successively add prescribed numbers to the prescribed data while circulating the prescribed data. In addition, the method includes the steps of determining Hough conversion data corresponding to the following coordinate data $(x+g, y)$ in the x-axis direction of coordinate data $(x, y)$ in accordance with the following equation:

$$\rho(x+g, y, \theta_n) = \rho(x, y, \theta_n) + a$$

where a and g are constants, and $a = g \cdot \cos\theta_n$, when the equation for the Hough conversion of the coordinate data $(x, y)$ at the time the coordinate data are set as $(x, y)$ is given by the following equation:

$$\rho(x, y, \theta_n) = x \cdot \cos\theta_n + y \cdot \sin\theta_n;$$

and determining Hough conversion data corresponding to the following coordinate data $(x, y+h)$ in the y-axis direction of the coordinate data $(x, y)$ in accordance with the following equation:

$$\rho(x, y+h, \theta_n) = \rho(x, y, \theta_n) + b$$

where b and h are constants, and $b = h \cdot \sin\theta_n$.

19 Claims, 11 Drawing Sheets

APPARATUS FOR AND METHOD OF HOUGH-CONVERTING COORDINATE DATA

BACKGROUND OF THE INVENTION

1 Field of the Invention

The present invention relates to an apparatus for and a method of Hough-converting coordinate data.

2. Description of the Related Art

As one of methods for detecting straight line segments, there is known one referred to as "Hough Conversion" (disclosed in U.S. Pat. No. 3,069,654, for example). Hardware for effecting the Hough conversion is disclosed, for example, in the article "Hardware for Hough Conversion Using ROM" by K. Onda, et al., (all-Japan meeting of the 70th anniversary of the founding of the Institute of Electronics and Communication Engineers of Japan, No. 1587, 1987). The disclosed is shown in FIGS. 1 and 2.

Figure 1:
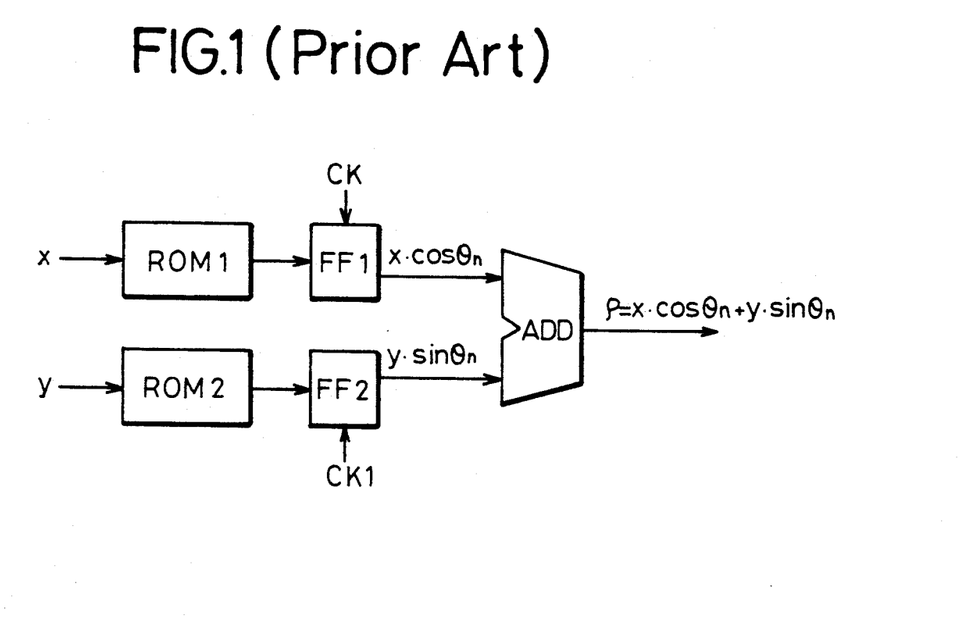
FIGS. 1 and 2 are diagrams showing the structures of a conventional processing element and Hough converting circuit, respectively.
Figure 2:
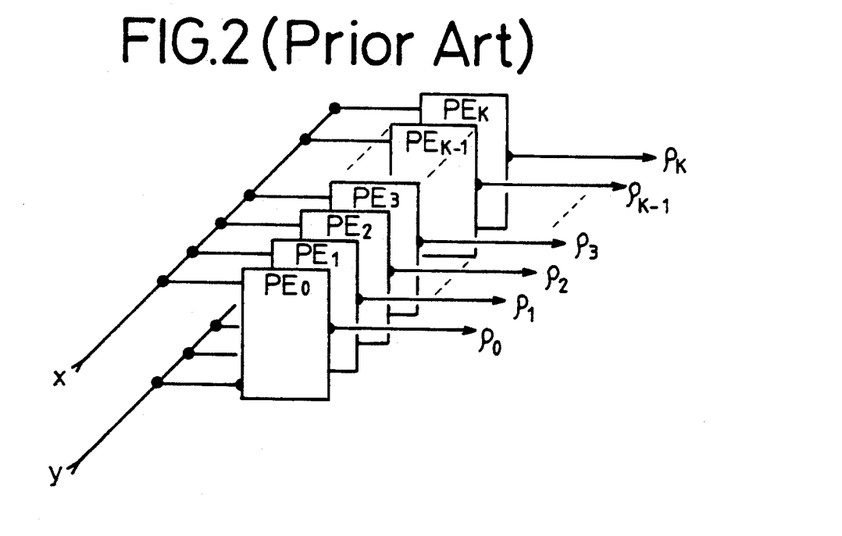

FIG. 1 is a block diagram of a single processing element PE. FIG. 2 is a block diagram showing a Hough converting circuit having $k+1$ processing elements $PE_0$ to $PE_k$ obtained by dividing $\rho$-$\theta$ parameter space into $k+1$ pieces in a $\theta$ direction and connected in parallel. As shown in FIG. 1, the processing element PE comprises memories ROM1, ROM2 for storing therein values of data of $x \cdot \cos\theta_n$ and $y \cdot \sin\theta_n$, respectively, for each value $\theta$, taking x, y as addresses, flip-flops FF1, FF2 for temporarily storing therein the values of the data of $x \cdot \cos\theta_n$ and $y \cdot \sin\theta_n$, which are outputted from the ROM1, ROM2, respectively, and an adder (ADD) for adding the values of the data of $x \cdot \cos\theta_n$ and $y \cdot \sin\theta_n$ so as to output the added result of Hough conversion, i.e., $\rho$ by the following equation:

$$\rho = x \cdot \cos\theta_n + y \cdot \sin\theta_n$$

According to the processing element PE, the expressions ($x \cdot \cos\theta_n$ and $y \cdot \sin\theta_n$) representing a Hough curve (sine curve) in a $\rho$-$\theta$ plane can be added as given below if the values of coordinates (x, y) in an X-Y rectangular coordinate system are inputted.

$$\rho = x \cdot \cos\theta_n + y \cdot \sin\theta_n$$

Therefore, $k+1$ kinds of values $\rho$ ($\rho_0 \rho_1, \ldots, \rho_k$) with respect to the coordinates (x, y) can be determined simultaneously by connecting the $k+1$ processing elements in parallel as shown in FIG. 2.

However, this method has a disadvantage that the ROM1 and ROM2 must be provided for each value $\rho$. It is therefore difficult to integrate easily the components of the Hough converting circuit into LSI chips, so that hardware is significantly large-scaled and complicated. In order to facilitate the integration of the components into the LSI chips, there is known a method for making ROMs in the form of RAMs. However, such a method has a disadvantage that the degree of integration cannot be increased. In addition, the resolution capabilities of the Hough converting circuit in a $\theta$ direction in the $\rho$-$\theta$ parameter space are determined by the data stored in the ROM1 and ROM2. It is therefore very difficult to carry out a change in setting of the resolution of the circuit in the $\theta$ direction.

SUMMARY OF THE INVENTION

It is a principal object of the present invention to provide an apparatus for performing Hough conversion of coordinate data, which can be fabricated in a simple structure and easily made in the form of an LSI chip, and wherein the change in setting of the resolution in a $\theta$ direction can easily be performed, and to provide a method of performing Hough conversion of the coordinate data.

A first object of the present invention is to provide an apparatus for performing Hough conversion of coordinate data in a rectangular coordinate system, comprising circulating means for receiving prescribed data corresponding to the coordinate data therein so as to successively add prescribed numbers to the prescribed data while at least circulating the prescribed data.

A second object of the present invention is to provide the apparatus wherein the one circulating means comprises a first circulating means for receiving first prescribed data therein so as to successively add prescribed numbers to the first prescribed data while circulating the first prescribed data thereby output the result of addition therefrom, and a second circulating means for receiving second prescribed data therein so as to successively add prescribed numbers to second prescribed data and for receiving therein the result of addition outputted from the first circulating means.

A third object of the present invention is to provide an apparatus for performing Hough conversion of coordinate data in a rectangular coordinate system, comprising a third circulating means for receiving therein first prescribed data corresponding to one of the coordinate data located on coordinate axes so as to add the first prescribed data to circulating data for each circulation of the first prescribed data while at least circulating the first prescribed data, and for accumulatively adding data corresponding to the other of the coordinate data located on the coordinate axes each time the circulating data circulates prescribed times.

A fourth object of the present invention is to provide the apparatus wherein the third circulating means comprises a first holding means for holding circulating data therein for each circulation thereof, and a first adding means for receiving the circulating data stored in the first holding means and the first prescribed data therein so as to add the two data together, thereby supplying the result thus added to the first holding means.

A fifth object of the present invention is to provide the apparatus wherein the third circulating means includes a fourth circulating means for receiving second prescribed data corresponding to the other of the coordinate data therein so as to add the second prescribed data to the circulating data for each circulation thereof while at least circulating the second prescribed data, thereby outputting the so-added result therefrom as data corresponding to the other of the coordinate data.

A sixth object of the present invention is to provide the apparatus wherein the fourth circulating means comprises a second holding means for holding circulating data therein for each circulation thereof, and a second adding means for receiving the circulating data stored in the second holding means and the second prescribed data therein so as to add the two data together, thereby supplying the so-added result to the second holding means.

A seventh object of the present invention is to provide the apparatus wherein the first adding means includes a first selecting means for receiving therein two inputs comprising the result of addition of the circulating data and the first prescribed data and the data corresponding to the other of the coordinate data so as select one of the two inputs, thereby supplying the one input to the first holding means as circulating data.

An eighth object of the present invention is to provide a method of successively performing Hough conversion of coordinate data continuous in coordinate-axes directions of a rectangular coordinate system, which comprises the steps of setting the coordinate data as (x, y); determining Hough conversion data corresponding to the following coordinate data (x+g, y) in the x-axis direction of the coordinate data (x, y) in accordance with the following equation:

$$\rho(x+g, y, \theta_n) = \rho(x, y, \theta_n) + a$$

where a and g are constants, and $a = g \cdot \cos\theta_n$ when the equation for the Hough conversion of the coordinate data at the time of said setting step is represented by the following equation:

$$\rho(x, y, \theta_n) = x \cdot \cos\theta_n + y \cdot \sin\theta_n;$$

and determining Hough conversion data corresponding to the following coordinate data (x, y+h) in the y-axis direction of the coordinate data (x, y) in accordance with the following equation:

$$\rho(x, y+h, \theta_n) = \rho(x, y, \theta_n) + b$$

where b and h are constants, and $b = h \cdot \sin\theta_n$.

A ninth object of the present invention is to provide an apparatus for successively reading, in the y-axis direction, data in a coordinate system in which the values x and y of two-dimensional coordinates (x, y) are varied at a prescribed interval (h) continuously while scanning the data in the x-axis direction taking x- and y-axis directions as main and sub scanning directions respectively, thereby performing Hough conversion of the coordinates (x, y) in accordance with the following equation:

$$\rho(x, y, \theta_n) = x \cdot \cos\theta_n + y \cdot \sin\theta_n.$$

the apparatus comprising a first means for receiving data of $h \cdot \sin\theta_n$ therein so as to circulate the same therein and add the same accumulatively each time one scanning operation corresponding to the prescribed interval is made, thereby outputting data corresponding to the $y \cdot \sin\theta_n$ therefrom; a second means for receiving data of $g \cdot \cos\theta_n$ therein so as to circulate the same therein and add the same accumulatively each time one scanning operation corresponding to the prescribed interval is made, thereby outputting data corresponding to the $x \cdot \cos\theta_n$; and a third means for outputting data corresponding to the $\rho(x, y, \theta_n)$ based on the output data of the first and second means.

A tenth object of the present invention is to provide an apparatus for successively reading, in the y-axis direction, data in a coordinate system in which the values x and y of two-dimensional coordinates (x, y) are changed so as to be incremented g by g and h by h respectively while scanning the data in the x-axis direction taking the x- and y-axis directions as main and sub scanning directions respectively, thereby effecting Hough conversion of the coordinates (x, y) in accordance with the following equation:

$$\rho(x, y, \theta_n) = x \cdot \cos\theta_n + y \cdot \sin\theta_n.$$

the apparatus comprising a first arithmetic means including a first memory means for receiving data of $h \cdot \sin\theta_n$ so as to store the same therein and a first adding means for adding the contents of the data stored in the first memory means and a previous result of addition together each time the value y is incremented h by h so as to output a new result of addition therefrom, the first arithmetic means serving to output data corresponding to the $y \cdot \sin\theta_n$ therefrom; a second arithmetic means including a second memory means for receiving data of $g \cdot \cos\theta_n$ so as to store the same therein and a second adding means for adding the contents of the data stored in the second memory means and a previous result of addition together each time the value x is incremented g by g so as to output a new result of addition therefrom, the arithmetic means serving to output data corresponding to the $x \cdot \cos\theta_n$ therefrom; and data outputting means for outputting data corresponding to the $\rho(x, y, \theta_n)$ based on the output data of the first and second arithmetic means.

An eleventh object of the present invention is to provide the apparatus wherein the data outputting means includes at least one multiplexer for receiving the output data of the first and second arithmetic means therein.

A twelfth object of the present invention is to provide the apparatus further comprising a third memory means for receiving data of $x_0 \cdot \cos\theta_n + y_0 \cdot \sin\theta_n$ to store the same therein, and means for setting the third memory means to an addition initial value at the time of start of addition by the first arithmetic means.

A thirteenth object of the present invention is to provide an apparatus for successively performing Hough conversion of coordinate data continuous in coordinate-axes directions of a rectangular coordinate system, which comprises a plurality of processing elements arranged in association with a plurality of values $\theta_n$ which are different from one another, the arrangement of each of the processing elements being such that when the equation for the Hough conversion of the coordinate data at the time the coordinate data are set as (x, y) is given by the following equation:

$$\rho(x, y, \theta_n) = x \cdot \cos\theta_n + y \cdot \sin\theta_n,$$

Hough conversion data corresponding to the following coordinate data (x+g, y) in the x-axis direction of the coordinate data (x, y) are determined in accordance with the following equation:

$$\rho(x+g, y, \theta_n) = \rho(x, y, \theta_n) + a$$

where a and g are constants, and $a = g \cdot \cos\theta_n$, and Hough conversion data corresponding to the following coordinate data (x, y+h) in the y-axis direction of the coordinate data (x, y) are determined in accordance with the following equation:

$$\rho(x, y+h, \theta_n) = \rho(x, y, \theta_n) + b$$

where b and h are constants, and $b = h \cdot \sin\theta_n$.

A fourteenth object of the present invention is to provide an apparatus for successively reading, in the y-axis direction, data in a coordinate system in which the values x and y of two-dimensional coordinates (x, y) are continuously changed at prescribed intervals g and h respectively while scanning the data in the x-axis direction taking the x- and y-axis directions as main and sub scanning directions respectively, thereby effecting Hough conversion of the coordinates (x, y) in accordance with the following equation:

$$\rho(x, y, \theta_n) = x \cdot \cos\theta_n + y \cdot \sin\theta_n,$$

the apparatus comprising a plurality of processing elements arranged in association with the plurality of values $\theta_n$ which are different from one another, the plurality of processing elements each including a first means for receiving data of $h \cdot \sin\theta_n$ so as to circulate the same therein and add the same accumulatively each time one scanning operation corresponding to one of the prescribed intervals is made, thereby outputting data corresponding to the $y \cdot \sin\theta_n$ therefrom; a second means for receiving data of $g \cdot \cos\theta_n$ so as to circulate the same therein and add the same accumulatively each time one scanning operation corresponding to the other of the prescribed intervals is made, thereby outputting data corresponding to the $x \cdot \cos\theta_n$; and a third means for outputting data corresponding to the $\rho(x, y, \theta_n)$ based on the output data of the first and second means.

A fifteenth object of the present invention is to provide an apparatus for reading data in a coordinate system in which the values x and y of two-dimensional coordinates (x, y) are continuously changed at prescribed intervals respectively while scanning the data taking x- and y-axis directions as main and sub scanning directions respectively, thereby effecting Hough conversion of the coordinates (x, y) in accordance with the following equation:

$$\rho(x, y, \theta_n) = x \cdot \cos\theta_n + y \cdot \sin\theta_n,$$

the apparatus comprising a fourth memory means for receiving data of $\sin\theta_n \cdot (l+1) \cdot \cos\theta_n$ to store the same therein when the number of coordinate points in the x-axis direction is set to (N+t); a second memory means for receiving data of $g \cdot \cos\theta_n$ to store the same therein; and a fifth circulating means for adding the contents of the data stored in the second memory means and a previous result of addition each time the value x is increased g by g so as to produce the result thus added as a new result of addition, and for adding the contents of the data stored in the fourth memory means to the new result of addition each time the first-mentioned addition is repeated l times to thereby output the so-added result therefrom.

A sixteenth object of the present invention is to provide the apparatus wherein the fifth circulating means comprises a second selecting means for receiving therein the contents of the data stored in the second memory means and the contents of the data stored in the fourth memory means so as to select the contents of the data stored in the fourth memory means only when the addition subsequent to the addition of l times is made and to select the contents of the data stored in the second memory means when the addition other than the addition is made, thereby outputting the contents thus selected as an output therefrom, a fifth adding means for receiving the output of the second selecting means therein as one input, and a third holding means for receiving and holding the output of the fifth adding means therein and for accepting the output of the fifth adding means therein as the other input.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 3:
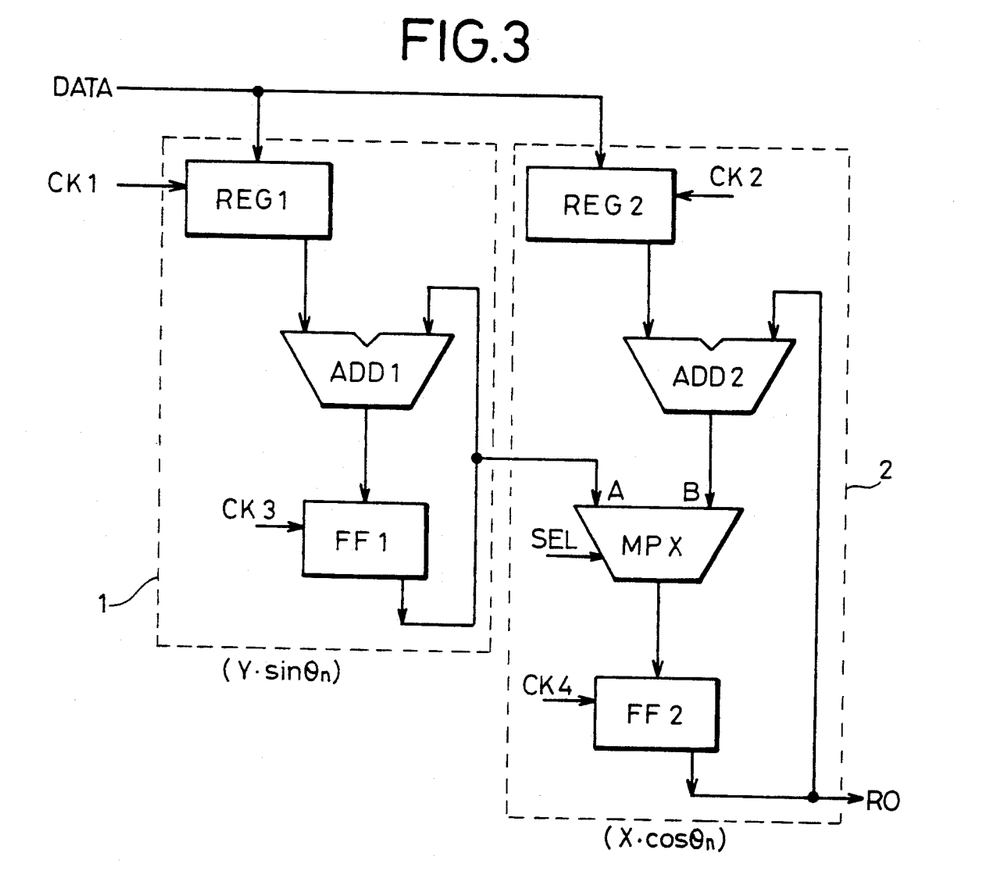
FIG. 3 is a block diagram depicting a processing element PE according to one embodiment of the present invention.
Figure 4:
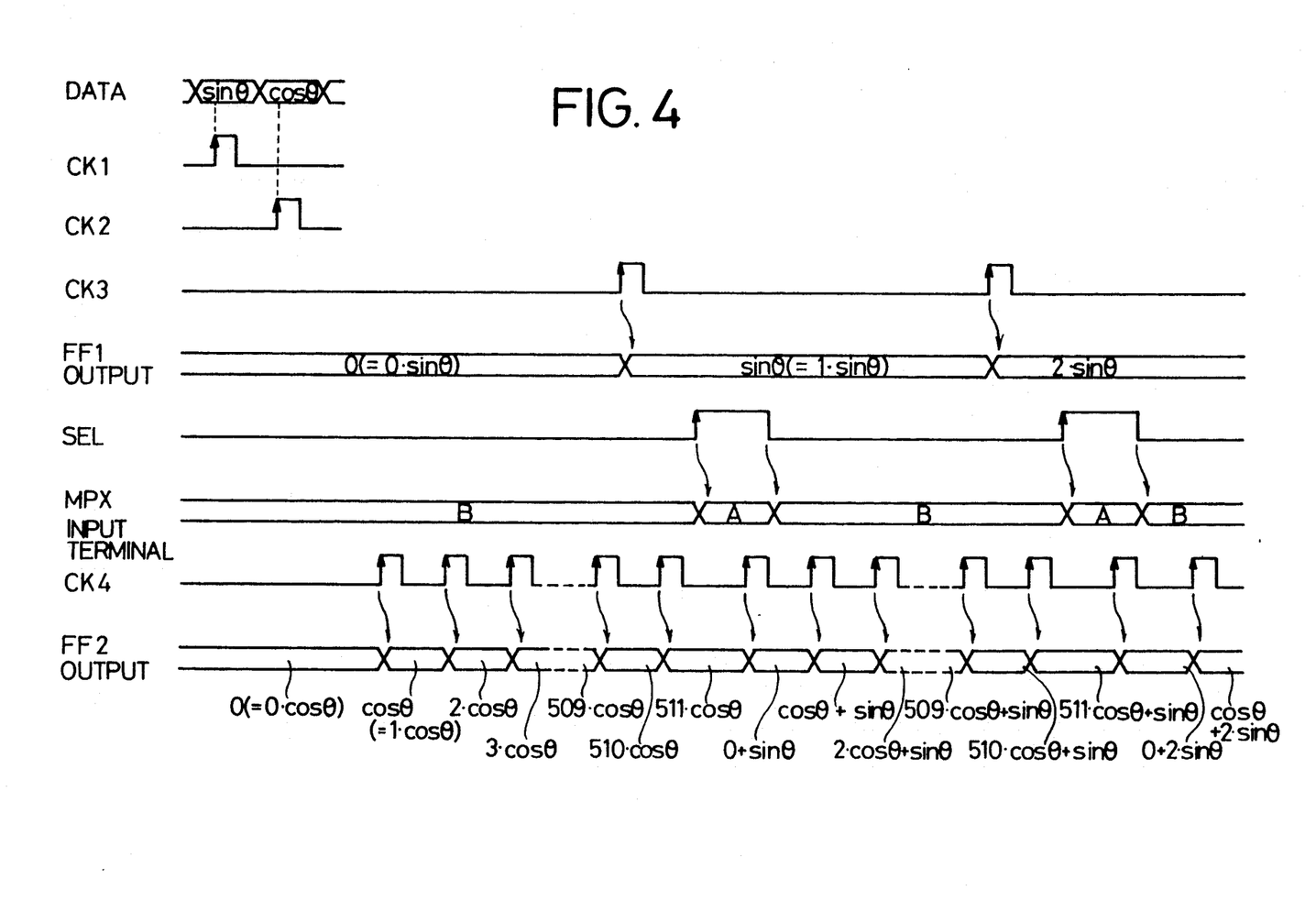
FIG. 4 is a timing chart for describing the operation of the processing element PE.
Figure 5:
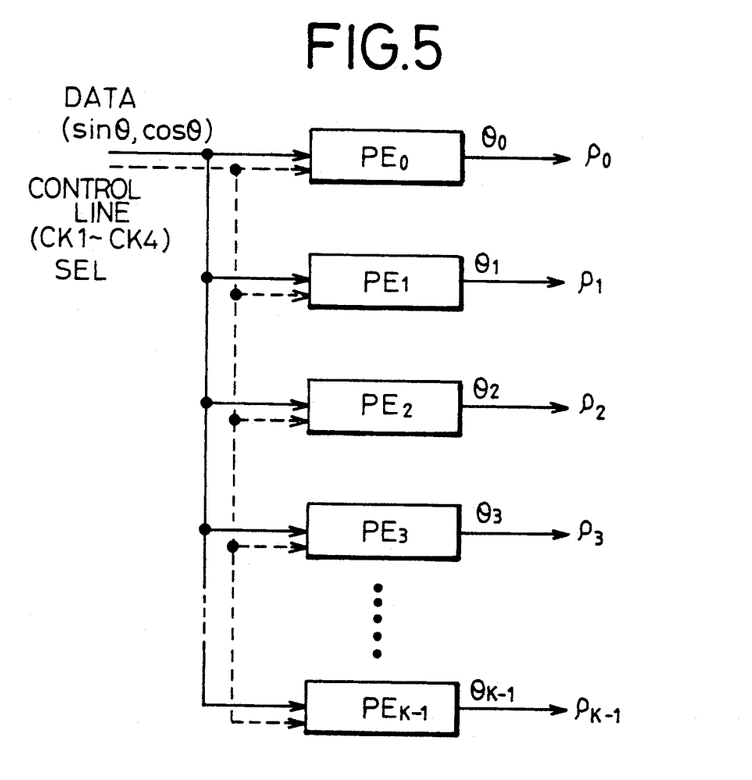
FIG. 5 is a diagram illustrating the structure of a Hough converting circuit according to said one embodiment of the present invention.

A processing element PE according to one embodiment of the present invention is constructed as shown in FIG. The processing element PE is activated in accordance with a timing chart shown in FIG. 4. The processing element PE is made up of a combination of respective processing elements as shown in FIG. 5 by way of example, and forms a circuit for performing Hough conversion.

Prior to a specific description of the present embodiment, the principle of the present invention will be described below with reference to FIGS. 6 through FIG. 10 in order to facilitate the understanding of the present invention.

Figure 6:
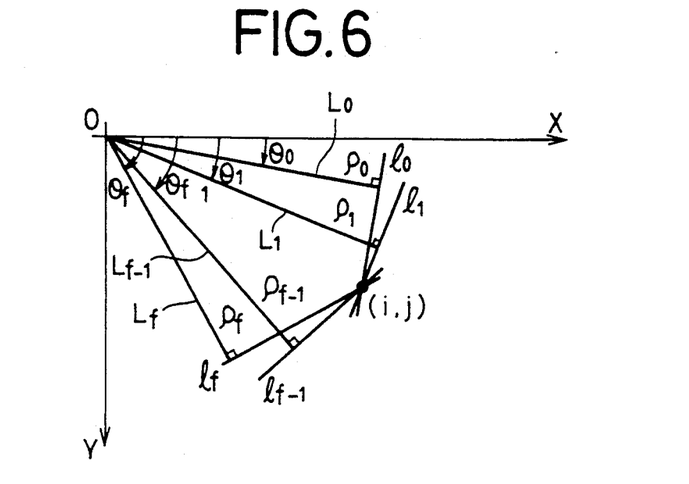
FIGS. 6 and 7 are diagrams each for describing the principle of Hough conversion.

Let's now consider Hough conversion of a coordinate (i, j) in an X-Y coordinate system. First of all, straight line segments $l_0, l_1, \ldots, l_{f-1}, l_f$, which pass through the coordinate (i, j), are plotted, and straight line segments $L_0, L_1, \ldots, L_{f-1}, L_f$, which pass through the origin (0, 0) and meet at right angles to these straight line segments $l_0, l_1, \ldots, l_{f-1}, l_f$ are drawn. As a consequence, $\rho_0, \rho_1, \ldots, \rho_f$ out of Hough conversion data $(\rho, \theta)$ are each determined as the length of each of the straight line segments $L_0, L_1, \ldots, L_f$, and $\theta_0, \theta_1, \ldots, \theta_f$ out of the Hough conversion data $(\rho, \theta)$ are determined as angles made between the X axis and each of the straight line segments $L_0, L_1, \ldots, L_f$, respectively. When the value $\theta$ is successively changed with the coordinate (i, j) being fixed, the value $\rho$ is given by the following equation:

$$\rho = i \cdot \cos\theta + j \cdot \sin\theta$$

Figure 7:
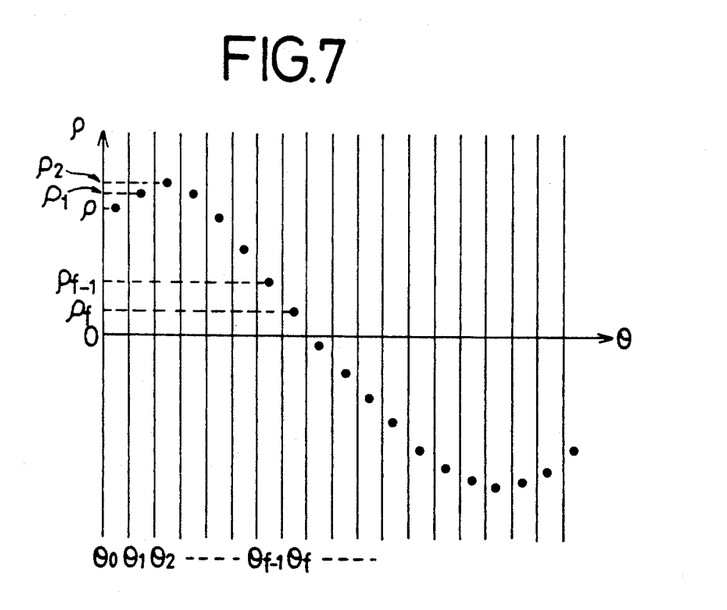

The arithmetic operation of the value $\rho$ can be performed by a processing element PE shown in FIG. 1 by way of example. If the values $\theta$ in $X \cdot \cos\theta_n$ and $Y \cdot \sin\theta_n$, which are stored as data in ROM1 and ROM2 respectively, are set as $\theta_0, \theta_1, \ldots, \theta_{f-1}, \theta_f$, the value $\rho$ is determined as each of $\rho_0, \rho_1, \ldots, \rho_{f-1}, \rho_f, \ldots$ in association with each value $\theta$ with respect to the coordinate (i, j). When each of $\rho_0, \rho_1, \ldots, \rho_{f-1}, \rho_f, \ldots$ thus determined is plotted in a $\rho$-$\theta$ plane, a Hough curve with respect to the coordinate (i, j) can be represented in the form of a sine curve such as shown in FIG. 7.

Figure 8:
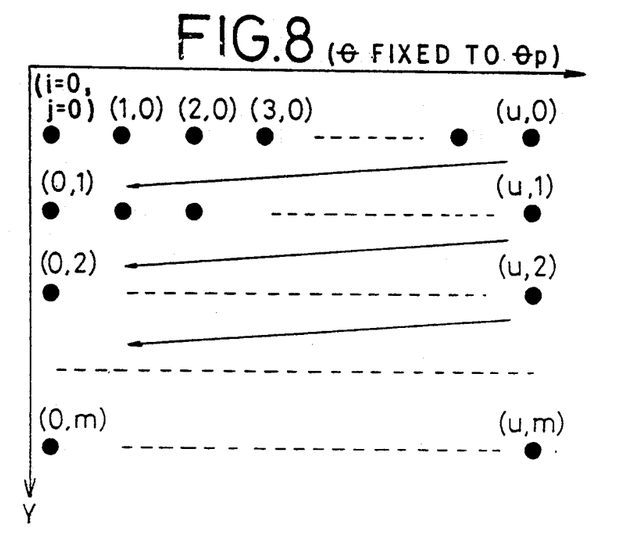
FIGS. 8, 9 and 10 are diagrams each for describing the principle of Hough conversion according to the present invention.

A novel method completely different from the method referred to above is adopted in the present invention. More specifically, the value i in the coordinate (i, j) is successively changed while fixing the value $\theta_{92}$ as shown in FIG. 8 on the assumption that the coordinate (i, j) is continuous in a raster scan form. Let's here assume that the values i and j in the coordinate (i, j) are increased one by one from zero for the simplicity of description.

Figure 9:
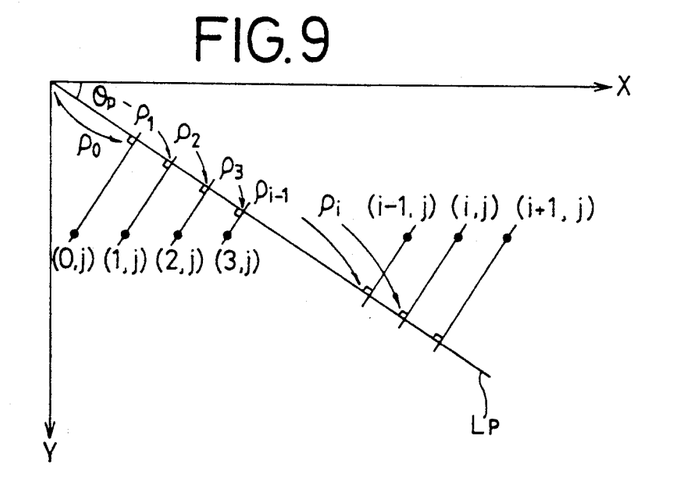

Let's now consider where the coordinate value in the Y-axis direction is fixed to j as shown in FIG. 9. Then, a straight line segment $L_p$ is drawn from the origin (0, 0) in a state in which the value $\theta$ has been fixed to ($\theta_p$) As a consequence, the value $\rho$ with respect to each of the coordinates (0, j), (1, j), (2, j), ..., (i-1, j), (i, j), (i+1, j), ... is determined as each of $\rho, \ldots, \rho_{i-1}, \rho_i, \rho_{i+1}, \ldots$ Since the coordinate value j in the Y-axis direction is fixed, $\rho_i$ is given by the following equation:

$$\rho_i = i \cdot \cos\theta + a$$

where a represents a constant.

Figure 10:
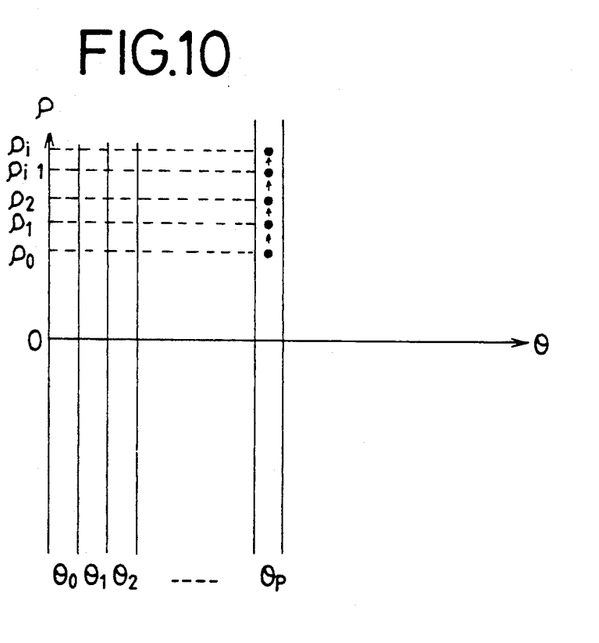

When the value $\rho$ thus determined is plotted in the $\rho$-$\theta$ plane, the result is as shown in FIG. 10. Therefore, the value $\rho$ at $\theta_p$, corresponding to the situation wherein coordinate value in the Y-axis direction is equal to zero, is determined in a first Step, and the value $\rho$ at $\theta_p$, corresponding to the situation wherein the coordinate value in the Y-axis direction is equal to one, is determined in a second Step, and so on, as the values in the Y-axis direction are successively incremented. Thus, the value $\rho$ at $\theta_p$, corresponding to the coordinate value in the Y-axis direction being equal to each of 2, 3, ..., m, ... is hereafter determined repeatedly. As a consequence, the value $\theta = \theta_p$ is determined with respect to all the coordinates indicated by black circle spots in FIG. 8. The processing element PE shown in FIG. 3 is used to perform such processing referred to above.

Then, when a Hough converting circuit shown in FIG. 5 is constructed by allotting a single processing element PE to each value $\theta$ as in the case where a processing element PE0 is allotted to the value $\theta_0$, a processing element PE1 is allotted to the value $\theta_1$, a processing element PE2 is allotted to the value $\theta_2$, ..., the Hough conversion processing with respect to all the coordinates can be performed in a parallel manner. More specifically, the present invention is so constructed that when the equation for the Hough conversion of the coordinate (x, y) in the X-Y coordinate system to be Hough-converted is represented as follows:

$$\rho(x, y, \theta_n) = x \cdot \cos\theta_n + y \cdot \sin\theta_n$$

where n=0, 1, 2, ..., k−1, Hough conversion data relative to the following coordinate (x+1, y) in the X-axis direction are determined from the following equation:

$$\rho(x+1, y, \theta_n) = \rho(x, y, \theta_n) + a$$

where a represents a constant. In addition, Hough conversion data relative to the following coordinate (x, y+1) in the Y-axis direction are determined from the following equation:

$$\rho(x, y+1, \theta_n) = \rho(x, y, \theta_n) + b$$

where b represents a constant.

A description will now be made of the processing element PE according to the present embodiment with reference to FIG. 3.

As shown in FIG. 3, processing element $PE_n$ comprises a first circuit 1 used to perform the arithmetic operation of $Y \cdot \sin\theta_n$, and a second circuit 2 used to carry out the arithmetic operation of $X \cdot \cos\theta_n$ and output the result of its arithmetic operation therefrom. In the same drawing, DATA are represented as $\sin\theta_n$, $\cos\theta_n$, and stored in registers 1, 2 (hereinafter called "REG1 and REG2") in synchronism with clocks 1, 2 (hereinafter called "CK1 and CK2"), respectively. Two adders 1, 2 (hereinafter called "ADD1 and ADD2") are used to add two input data, respectively. An output from the ADD1 is stored in a flip-flop 1 (hereinafter called "FF1"). A multiplexer (hereinafter called "MPX") serves to select one of input terminals A and B in response to a select signal (hereinafter called "SEL signal"), and store the result of processing by the multiplexer in a flip-flop 2 (hereinafter called "FF2"). The contents of the FF2 are fed back to the ADD2 in synchronism with a clock 4 (hereinafter called "CK4"), and supplied to a prescribed histogram updating unit as an output RO.

The operation of the above-described processing element PE will now be described briefly.

When the coordinates (0, 0), ..., (i, 0), ..., (u, 0) are processed, the value $\theta$ is taken as the value $\theta_n$. More specifically, $\rho$-$\theta$ parameter space is divided into k pieces in a $\theta$ direction, where n=0, 1, 2, ..., k−1. First, $\sin\theta_n$ and $\cos\theta_n$ are stored as data in the REG1 and REG2, respectively. However, prior to their storage, the FF1 and FF2 are reset to a zero state. When the value Y is kept constant (i.e., the value Y is equal to zero), the MPX selects the input terminal B thereof in response to the SEL signal. Therefore, the coordinate processing is executed only by the second circuit 2 for performing the arithmetic operation of $X \cdot \cos v_n$. Thus, the FF2 outputs $0 \cdot \cos\theta_n$, $1 \cdot \cos\theta_n$, $2 \cdot \cos\theta_n$, ..., $(i-1) \cdot \cos\theta_n$, $i \cdot \cos\theta_n$, ..., $u \cdot \cos\theta_n$ as the output R0 in synchronism with the CK4.

When all the coordinates up to (u, 0) have been processed as described in the preceding paragraph (i.e., after the calculation u $\cos\theta_n$ has been made), the value Y is incremented by 1 and the next line is calculated. Namely, the coordinates (0, 1), (1, 1), ..., (i, 1), ..., (u, 1) are processed. In this case, the MPX selects the input terminal A thereof in response to the SEL signal upon incrementing the value Y by 1, thus setting data of $1 \cdot \sin\theta_n$ which has been stored in the FF1 to the FF2. Then, the MPX selects again the input terminal B thereof in response to the SEL signal. Thus, $0 \cdot \cos\theta_n + 1 \cdot \sin\theta_n$, $1 \cdot \cos\theta_n + 1 \cdot \sin\theta_n$, 111, $u \cdot \cos\theta_n + 1 \cdot \sin\theta_n$ are calculated.

A further detailed description of the above-described operation will be made with reference to a timing chart shown in FIG. 4. Incidentally, the value $\theta_n$ is indicated as the value $\theta$ in FIG. 4 for the purposes of simplicity, and the reference character u is set equal to 511.

First of all, the REG1 and REG2 store data of $\sin\theta_n$ and $\cos\theta_n$ therein in synchronism with rises of the CK1 and CK2, respectively. Since the FF1 and FF2 have been reset, the outputs thereof are both zero ($0\cdot\sin\theta_n$ and $0\cdot\cos\theta_n$.) In addition, the MPX selects the input terminal B.

When the FF2 supplies the output to the ADD2 in synchronism with the rise of the CK4 so as to circulate therein, the output from the FF2 is changed to $1\cdot\cos\theta_n$, $2\cdot\cos\theta_n$, .... If the SEL signal is set to one when the output R0 becomes equal to 511 $\cos\theta_n$, the MPX selects the input terminal A in response to the SEL signal. At this time, the output from the FF1 has already been changed into $1\cdot\sin\theta_n$ in response to the rise of the CK3. Thus, the FF2 outputs $\sin\theta_n (=0\cdot\cos\theta_n+1\cdot\sin\theta_n)$ as data after $511\cdot\cos\theta_n$. Thereafter, when the SEL signal is set to zero, the MPX selects the input terminal B. Therefore, the output from the FF2 circulates in the ADD2 so as to be changed into $1\cdot\cos\theta_n+\sin\theta_n$, $2\cdot\cos\theta_n+\sin\theta_n$, $3\cdot\cos\theta_n+\sin\theta_n$, ... Then, if the SEL signal is set to one when the output R0 becomes equal to $511\cdot\cos\theta_n+\sin\theta_n$, the MPX switches the input terminal B to the input terminal A again. As a consequence, the FF1 supplies data of $2\cdot\sin\theta_n$ to the MPX. Accordingly, the FF2 outputs $2\cdot\sin\theta_n (=0\cdot\cos\theta_n+2\cdot\sin_n)$ as data after $511\cdot\cos\theta_n$ $+\sin\theta_n$. Thereafter, when the SEL signal is set to zero, the MPX is activated so as to switch the input terminal A to the input terminal B. Therefore, the output of the FF2 circulates in the ADD2 so as to be changed into $1\cdot\cos\theta_n+2\cdot\sin\theta_n$, $2\cdot\cos\theta_n+2\cdot\sin\theta_n$, $3\cdot\cos\theta_n+2\cdot\sin\theta_n$, ...

FIG. 5 shows a Hough converting circuit in which the processing element PE shown in FIG. 3 is employed.

In the Hough converting circuit, the $\rho$-$\theta$ parameter space is divided into k parts in the $\theta$ direction. The processing element $PE_n$ corresponds to each value $\theta_n$. Namely, respective processing elements $PE_0$, $PE_1$, ..., $PE_{k-1}$ bear their corresponding various values $\theta(=\theta_0, \theta_1, \theta_2, ..., \theta_{k-1})$. Accordingly, the arithmetic operation of each value $\theta$ at each processing element PE is carried out simply by adding each simple constant together. It is therefore possible to perform the Hough conversion at extremely high speed.

Figure 11:
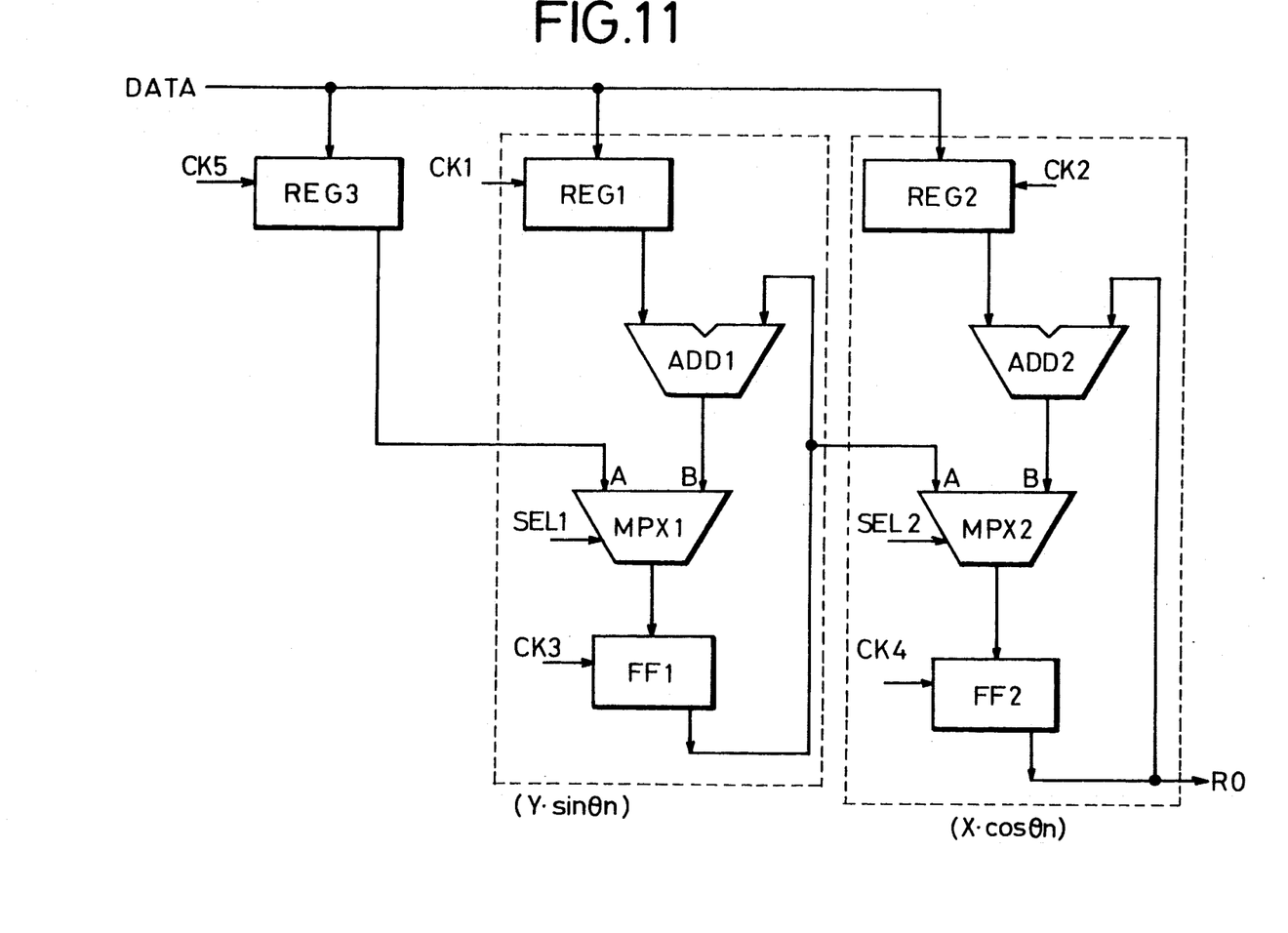
FIG. 11 is a block diagram showing a modification of the processing element PE according to said one embodiment of the present invention.

The processing element PE shown in FIG. 3 can also be modified as illustrated in FIG. 11.

The modification shown in FIG. 11 is different from the processing element PE depicted in FIG. 3 in that a REG3 for storing data of $X_0\cdot\cos\theta+Y_0\cdot\sin\theta$ ($X_0$ and $Y_0$ are arbitrary constants) therein is further provided and an MPX1 is provided between the ADD1 and the FF1 and having an input terminal A thereof connected to the output of the REG3. Incidentally, an MPX2 functions in the same manner as the MPX shown in FIG. 3, and a SEL2 signal corresponds to the SEL signal shown in FIG. 3. According to this modification, when the MPX1 selects the input terminal A in response to the SEL1 signal, the coordinate values for starting the Hough conversion can arbitrarily be set. By returning the input terminal A to the input terminal B after having established the coordinate values, the modification can be activated in the same manner as the processing element shown in FIG. 3.

Even in the case where the coordinate values (i, j) in the X-Y coordinate system are incremented g by g, and h by h, respectively, data to be inputted to the REG1, REG 2 shown in FIG. 3 or FIG. 11 can be treated as being $h\cdot\cos\theta$, $g\cdot\cos\theta$.

Figure 12:
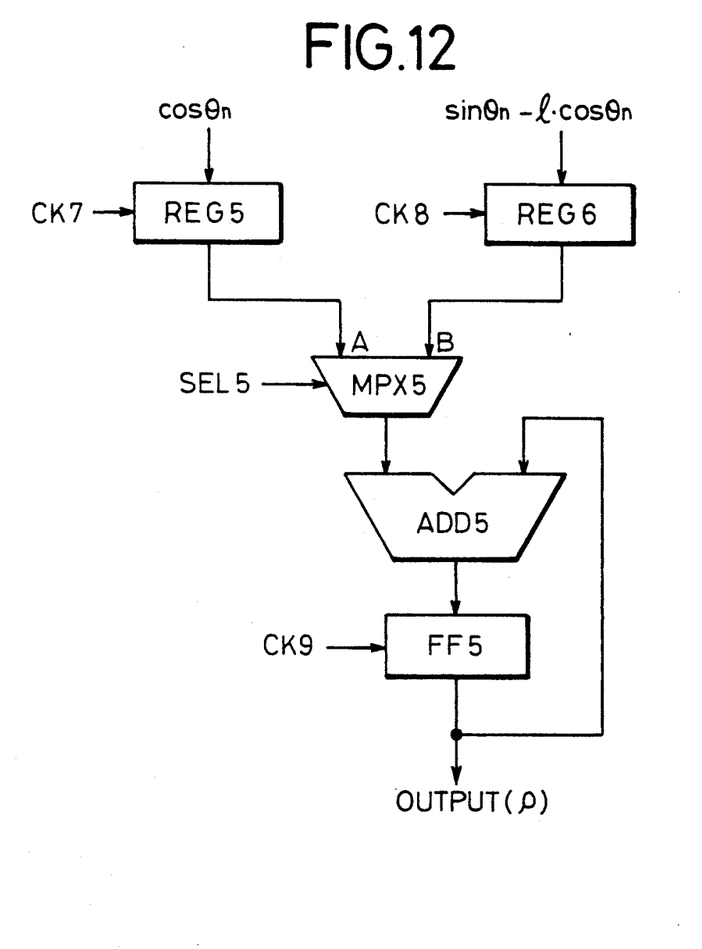
FIG. 12 is a block diagram depicting hardware that makes up a processing element PE according to another embodiment of the present invention.

FIG. 12 is a block diagram showing a processing element (PE) according to another embodiment of the present invention. The processing element according to the present embodiment is different from that according to each of the embodiments shown in FIGS. 3 and 11. This processing element is provided only with a single circulating means for adding data accumulatively while circulating the same. As shown in FIG. 12, a REG5 stores "$\cos\theta_n$" as first data, and a REG6 stores "$\sin\theta_n -1\cdot\cos\theta_n$" as second data. An MPX5 serves to select one of the input terminals A and B in response to a SEL5 signal, and supplies an output to an ADD5. An output from the ADD5 is supplied to an FF5 from which an output ($\rho$) is taken out to the outside and fed back to the ADD5.

Figure 13A:
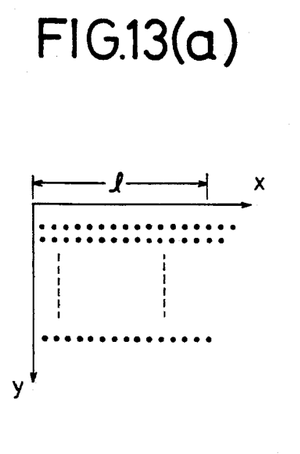
FIG. 13 is a diagram for describing a coordinate data scanning method and the principle of Hough conversion for the coordinate data.
Figure 13B:
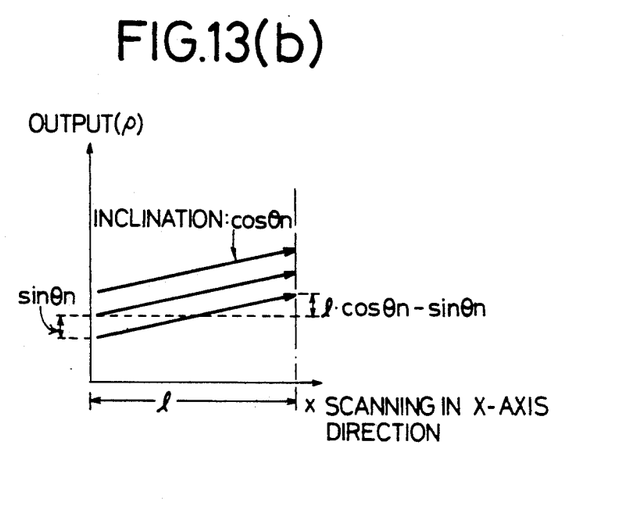
Figure 14:
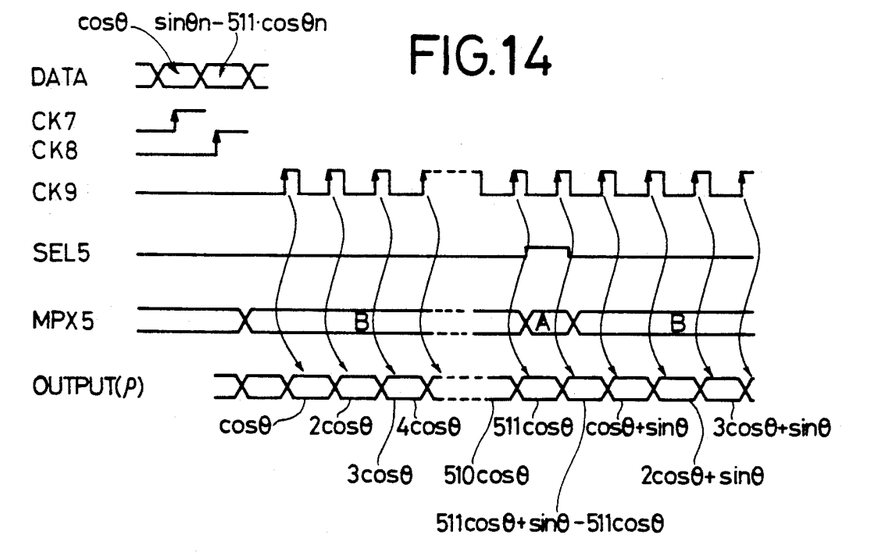
FIG. 14 is a timing chart for describing the operation of the processing element according to said another embodiment of the present invention.

The operation of the processing element shown in FIG. 12 is carried out as shown in FIGS. 13 and 14. The REG6 shown in FIG. 12 stores data of "$\sin\theta_n-1\cdot\cos\theta_n$" therein. However, the reference character "l" in this expression represents a region in the x-axis direction, which is to be scanned on the x-y coordinate, as shown in FIG. 13(a). In addition, the principle of calculation of the expression "$\sin\theta_n-1\cdot\cos\theta_n$ is as shown in FIG. 13(b). More specifically, when it is desired to perform Hough conversion, coordinate data are scanned in the x-axis direction provided that the value y is constant. Each time one line is scanned at an inclination of $\cos\theta_n$, data of "$\sin\theta_n-l\cos\theta_n$" is added to one line thus scanned, thereby incrementing the value y by 1 after which the following scanning operation is carried out. When such an operation is specifically described in association with the processing element shown in FIG. 12, it is represented by the timing chart shown in FIG. 14.

Incidentally, the value $\theta_n$ is represented as the value $\theta$ in FIG. 14 for the purposes of simplicity. The range l of a spindle in the x-axis direction is set equal to 511.

First of all, the REG5 stores data of $\cos\theta_n$ therein when a CK7 rises, and the REG6 stores data of $\sin\theta_n-511\cdot\cos\theta_n$ when a CK8 falls. When the MPX 5 selects the input terminal A, data circulate in a means comprising the ADD5 and FF5 and are added accumulatively. More specifically, the increase in the output ($\rho$) is made in order of $\con\theta_n$, $2\cdot\cos\theta_n$, $3\cdot\cos\theta_n$, ... each time a CK9 is set to 1. When the increase in the output ($\rho$) reaches $511\cdot\cos\theta_n$, the scanning process for one line in the x-axis direction is terminated. Then, when the input terminal A of the MPX5 is changed to the input terminal B thereof by the SEL5 signal, data of $511\cdot\cos\theta_n$ is added to data of $\sin\theta_n-511\cdot\cos\theta_n$ so as to output data of $\sin\theta_n$, so that the MPX5 selects the input terminal B. Therefore, coordinate data in the x-axis direction advanced by 1 in the y-axis direction are subsequently scanned.

Figure 15:
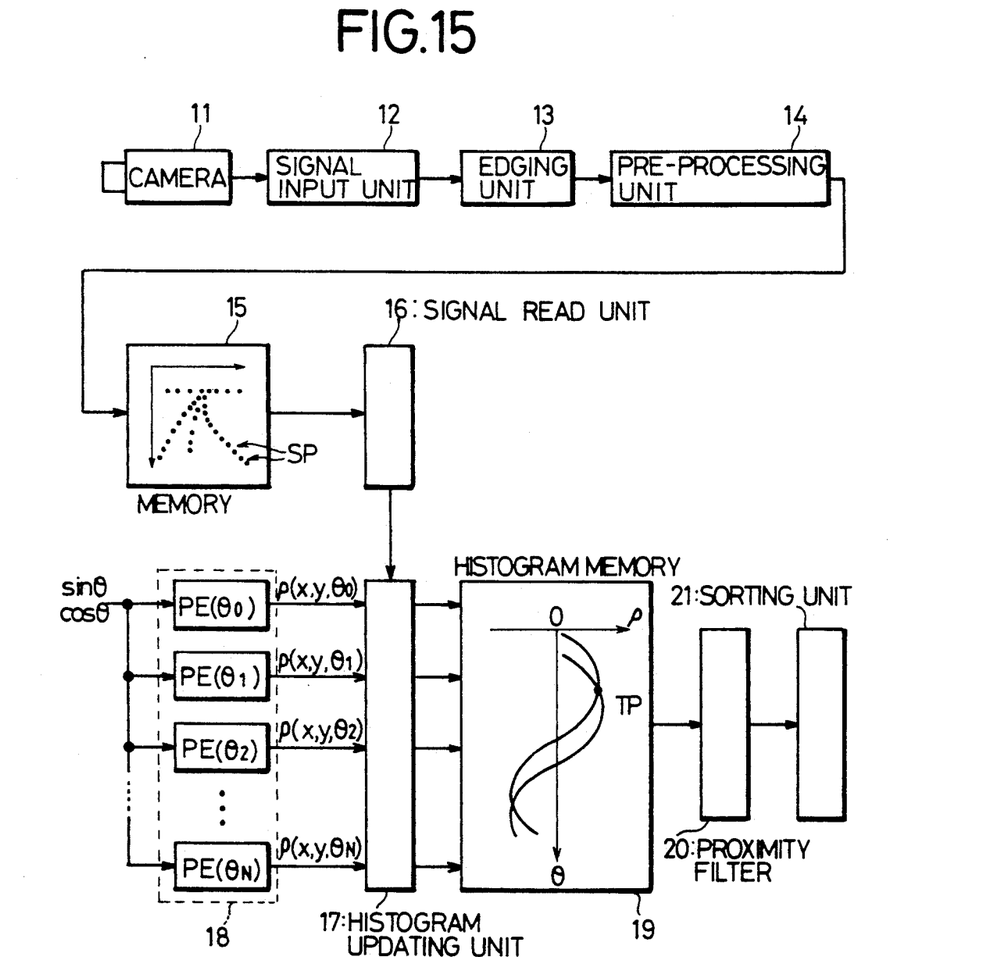
FIG. 15 is a block diagram showing an image processing apparatus to which a circuit according to the present invention is applied.

FIG. 15 is a block diagram showing an image processing apparatus in which the Hough converting circuit according to the embodiment of the present invention is employed.

A camera 11 scans an object (for example, a road to record the image of the object therein as an original image, and supplies image data to a signal input unit 12. The signal input unit 12 serves to convert the image data into digital data. An edging unit 13 differentiates the digital data in the coordinate-axes direction to output edged data therefrom. A preprocessing unit 14 includes a LUT (look-up table), and eliminates the components of noise from the edged data. If necessary, the pre-processing unit 14 performs the coordinate data conversion and supplies the same to a memory 15. Thus, the memory 15 stores therein concentration value data representing a series of spots (spots of an object to be processed) corresponding to configurations of the road, and stores 0 in a location other than the location where the concentration value data are stored. The detection of a straight line segment by the Hough conversion is performed by calculating Hough curves relative to the spots of the object to be processed and determining a histogram represented by intersections of the Hough curves in $\rho$-$\theta$ plane. Thus, a signal read unit 16 reads the contents of data stored in the memory 15 therefrom successively in the raster scan form, and supplies the same to a histogram updating unit 17.

On the other hand, a Hough converting circuit 18 comprises N+1 processing elements $PE(\theta_0)$ to $PE(\theta_N)$. Described more specifically, if the resolution of $\theta$ is set to 1 degree, $\theta_0, \theta_1, \theta_2, \ldots$ become equal to 0°, 1°, 2°, ..., respectively. Data of $\rho(x, y, \theta_0)$ to $\rho(x, y, \theta_N)$ determined by the processing elements $PE(\theta_0)$ to $PE(\theta_N)$ respectively are supplied to the histogram updating unit 17. Then, the histogram updating unit 17 adds the concentration value data representing the spots of the object to be processed to histogram data read, provided that the data $\rho(x, y, \theta_0)$ to $\rho(x, y, \theta_N)$ are taken as addresses, from a histogram memory 19 comprised of N+1 RAMs corresponding to the processing elements $PE(\theta_0)$ to $PE(\theta_N)$, and then restores the results of addition at the same addresses. Data stored in the histogram memory 19 are subjected to, for example, eight-step proximity filtering processes in a proximity filter 20, and the data thus processed are subjected to sorting in a sorting unit 21.

According to the present invention, as has been described above, the Hough conversion data corresponding to the coordinate (x, y) can be determined simply by inputting data of $h \cdot \sin\theta_n$ and $g \cdot \cos\theta_n$ (where h and g are constants) and adding the same accumulatively in accordance with the following equation:

$$ '=x \cdot \cos\theta_n + y \cdot \sin\theta_n $$

In other words, Hough conversion data $\rho(x+g, y, \theta_n)$ and Hough conversion data $\rho(x, y+h, \theta_n)$ represented by (x, y, $\theta_n$) at the following coordinates (x+g, y) and (x, y+h) of the coordinate (x, y), respectively can be determined simply by adding simple constants accumulatively. It is therefore possible simultaneously to both simplify the hardware and to perform Hough conversion processing at high speed.

Having now fully described the invention, it will be apparent to those skilled in the art that many changes and modifications can be made without departing from the spirit or scope of the invention as set forth herein.

What is claimed is:

1. An apparatus for performing Hough conversion of coordinate data in a rectangular coordinate system, comprising:
   first register means for receiving and storing first Hough conversion data therein;
   first adding means connected to said first register means for successively adding prescribed numbers to said first Hough conversion data and outputting the result of addition therefrom, wherein an output of said first register means is connected to one input of said first adding means;
   first circulating means comprising a first flip-flop connected to said adding means for circulating said first Hough conversion data through said first adding means as said prescribed numbers are successively added to said first Hough conversion data, wherein an output of said first flip-flop is connected to another input of said first adding means;
   second register means for receiving and storing second Hough conversion data therein;
   second adding means connected to said register means for successively adding prescribed numbers to said second Hough conversion data and outputting the result of addition therefrom, wherein an output of said second register means is connected to one input of said second adding means; and
   second circulating means comprising a second flip-flop connected to said second adding means for circulating said second Hough conversion data through said second adding means as said prescribed numbers are successively added to said second Hough conversion data, wherein an output of said second flip-flop is connected to another input of said second adding means.

2. An apparatus for performing Hough conversion of coordinate data in a rectangular coordinate system, comprising:
   first register means for receiving and storing first Hough conversion data therein;
   first adding means connected to said first register means for receiving therein said first Hough conversion data corresponding to a first coordinate and successively adding prescribed numbers to said first Hough conversion data and outputting the result of addition therefrom;
   first circulating means comprising a first flip-flop connected to said first adding means for circulating said first Hough conversion data through said first adding means as said prescribed numbers are successively added to said first Hough conversion data, wherein an output of said first circulating means is connected to an input of said first adding means;
   second register means for receiving and storing second Hough conversion data therein;
   second adding means connected to said second register means for receiving therein said second Hough conversion data corresponding to a second coordinate and successively adding prescribed numbers to said second Hough conversion data and outputting the result of addition therefrom; and
   second circulating means comprising a second flip-flop connected to said second adding means for circulating said second Hough conversion data through said second adding means as said prescribed numbers are successively added to said second Hough conversion data; wherein an output of said second circulating means is connected to an input of said second adding means;
   wherein an output of said first circulating means is accumulatively added to the output of said second circulating means each time said second Hough conversion data is circulated a predetermined umber of times by said second circulating means.

3. An apparatus according to claim 2, wherein said first circulating means comprises a first memory means for holding first circulating data therein for each circulating thereof, said first adding means receiving said first circulating data stored in said first memory means and said first Hough conversion data therein so as to add the two data together, thereby supplying the result thus added to said first memory means.

4. An apparatus according to claim 3, wherein said second circulating means comprises a second memory means for holding second circulating data therein for each circulation thereof, wherein said second adding means receives said second circulating data stored in said second memory means and said second Hough conversion data therein so as to add the two data together, thereby supplying the result thus added to said second memory means.

5. An apparatus according to claim 4, wherein said first and second memory means comprise said first and second flip-flops respectively.

6. An apparatus according to claim 4, further comprising a selecting means having two inputs for receiving data therein, wherein one of said inputs receives an output of said first adding means comprising the result of addition of said first circulating data and said first Hough conversion data, and the other of said inputs receives an output of said second adding means comprising the result of addition of said second circulating data and said second Hough conversion data, said selecting means selecting one of said two inputs.

7. An apparatus according to claim 6, wherein said selecting means comprises a multiplexer.

8. An apparatus for consecutively reading Hough conversion data in a x-axis direction from a two-dimensional (x,y) coordinate system in which coordinate values (x,y) of said two-dimensional coordinate system are varied at prescribed intervals (g,h) continuously while scanning said data in an x-axis direction, wherein said x-axis direction comprises a main scanning direction and said y-axis direction comprises a sub-scanning direction, thereby performing Hough conversion of said coordinates in accordance with the following equation:

$$\rho(x, y, \theta_n) = x \cdot \cos\theta_n + y \cdot \sin\theta_n$$

wherein $\theta_n$ is an angle between the x-axis and a straight line segment defined by said Hough conversion data, said apparatus comprising:

first register means for receiving and storing first Hough conversion data therein having a value $h \cdot \sin\theta_n$, wherein h has a predetermined value;

first adding means connected to said first register means for receiving therein said first Hough conversion data and adding a multiple of said value $h \cdot \sin\theta_n$ to said first Hough conversion data each time said y-coordinate is successively incremented by said prescribed interval h, thereby outputting y-coordinate data corresponding to $y \cdot \sin\theta_n$;

first circulating means comprising a first flip-flop connected to said first adding means for circulating the y-coordinate data through said first adding means as said y-coordinate is successively incremented by said prescribed internal h, wherein an output of said first circulating means is connected to an input of said first adding means;

second register means for receiving and storing second Hough conversion data therein having a value $g \cdot \cos\theta_n$, wherein g has a predetermined value;

second circulating means comprising a second flip-flop connected to said second adding means for circulating the x-coordinate data through said second adding means as said x-coordinate is successively incremented by said prescribed interval g, wherein an output of said second circulating means is connected to an input of said second adding means; and output means for selectively outputting the outputs of said first and second circulating means, wherein the output of said first circulating means is selected each time said x-coordinate data is circulated a predetermined number of times by said second circulating means, thereby outputting data corresponding to $x \cdot \cos\theta_n + y \cdot \sin\theta_n$.

9. An apparatus according to claim 8, wherein said first circulating means comprises a first memory means for holding and updating said y-coordinate data therein for each circulation of said circulating means, said first adding means receiving said y-coordinate data stored in said first memory means and said first Hough conversion data therein so as to add the two data together, thereby supplying the result thus added to said first memory means for updating said y-coordinate data.

10. An apparatus according to claim 9, wherein said second circulating means comprises a second memory means for holding and updating said x-coordinate data therein for each circulation of said circulating means, said second adding means receiving said x-coordinate data stored in said second memory means and said second Hough conversion data therein so as to add the two data together, thereby supplying the result thus added to said second memory means for updating said x-coordinate data.

11. An apparatus according to claim 10, wherein said first and second memory means comprise said first and second flip-flops respectively.

12. An apparatus according to claim 10, wherein said output means comprises at least one multiplexer for receiving the output data of said first circulating means and the output of said second adding means.

13. An apparatus according to claim 12, further comprising a third register means for receiving and storing therein data having a value $x_0 \cdot \cos\theta_n + Y_0 \cdot \sin\theta_n$, wherein $x_0$ and $y_0$ are predetermined initial values, and means for setting said third register means to an initial value at the time of start of addition by said first adding means.

14. An apparatus according to claim 13, further comprising another multiplexer for receiving the output of said third register and the output of said first adding means.

15. An apparatus for consecutively reading Hough conversion data in a y-axis direction from a two-dimensional (x, y) coordinate system in which coordinate values (x, y) of said two-dimensional coordinate system are varied at prescribed intervals (g,h) continuously while scanning said data in an x-axis direction, wherein said x-axis direction comprises a main scanning direction and said y-axis direction comprises a sub-scanning direction, thereby performing Hough conversion of said coordinates in accordance with the following equation:

$$\rho(x, y, \theta_n) = x \cdot \cos\theta_n + y \cdot \sin\theta_n$$

wherein $\theta_n$ is and angle between the x-axis and a straight line segment defined by said Hough conversion, data, said apparatus comprising:

a plurality of processing elements connected in series, wherein in each of said processing elements performs processing with respect to a variable $\theta_n$, wherein $\theta_n$ is different in each of said processing elements, each of said processing elements comprising:

first register means for receiving and storing first Hough conversion data therein having a value $h \cdot \sin\theta_n$, wherein h has a predetermined value;

first adding means connected to said first register means for receiving therein said first Hough conversion data and adding a multiple of said value $h \cdot \sin\theta_n$ to said first Hough conversion data each time said y-coordinate is successively incremented by said prescribed interval h, thereby outputting y-coordinate data corresponding to $y \cdot \sin\theta_n$;

first circulating means comprising a first flip-flop connected to said first adding means for circulating the y-coordinate data through said first adding means as said y-coordinate is successively incremented by said prescribed interval h, wherein an output of said first circulating means is connected to an input of said first adding means;

second register means for receiving and storing second Hough conversion data therein having a value $g \cdot \cos\theta_n$, wherein g has a predetermined value;

second adding means for receiving therein said second Hough conversion data and adding a multiple of said value $g \cdot \cos\theta_n$, to said second Hough conversion data each time said x-coordinate is successively incremented by said prescribed interval g, thereby outputting x-coordinate data corresponding to $x \cdot \cos\theta_n$; and second circulating means comprising a second flip-flop connected to said second adding means for circulating the x-coordinate data through said second adding means as said x-coordinate is successively incremented by said prescribed interval g, wherein an output of said second circulating means is connected to an input of said second adding means;

output means for selectively outputting the outputs of said first and second circulating means, wherein the output of said first circulating means is selected each time said x-coordinate data is circulated a predetermined number of times by said second circulating means, thereby outputting data corresponding to $x \cdot \cos\theta_n + y \cdot \sin\theta_n$.

16. An apparatus for consecutively reading Hough conversion data from a two-dimensional (x,y) coordinate system in which coordinate values (x,y) of said two-dimensional coordinate system are varied at prescribed intervals (g,h) continuously while scanning said data in an x-axis direction, wherein said x-axis direction comprises a main scanning direction and said y-axis direction comprises a subscanning direction, thereby performing Hough conversion of said coordinates in accordance with the following equation:

$$\rho(s, y, \theta_n) = x \cdot \cos\theta_n + y \cdot \sin\theta_n$$

wherein $\theta_n$ is an angle between the x-axis and a straight line segment defined by said Hough conversion data, said apparatus comprising:

first register means for receiving and storing first Hough conversion data therein having a value $\sin\theta_n - l \cdot \cos\theta_n$, wherein l is a predetermined constant indicating a length of said (x,y) coordinate system in the x-direction;

second register means for receiving and storing second Hough conversion data therein having a value $g \cdot \cos\theta_n$, wherein g has a predetermined value;

selecting means connected to said first and second register means for receiving therein the contents of the data stored in said first and second register means and for selecting and outputting one of said contents of said first and second register means;

adding means connected to an output of said selecting means for receiving therein said second Hough conversion data and adding a multiple of said value $g \cdot \cos\theta_n$ to said second Hough conversion data each time said x-coordinate is successively incremented by said prescribed interval g, and for receiving therein said first Hough conversion data and adding said first Hough conversion data to the result of addition of said multiple of said value $g \cdot \cos\theta_n$ and said second Hough conversion data each time said addition is repeated l times, thereby outputting (x,y) coordinate data; and circulating means comprising a flip-flop connected to said adding means for circulating the (x,y) coordinate data through said adding means as said x and y coordinates are successively incremented by said prescribed intervals g and h, wherein an output of said circulating means is connected to an input of said adding means.

17. An apparatus according to claim 16, wherein said circulating means comprises a memory means for holding and updating said (x,y) coordinate data therein for each circulation of said circulating means, said adding means receiving said (x,y) coordinate data stored in said memory means and one of said first and second Hough conversion data therein so as to add said (x,y) coordinate data to one of said first and second Hough conversion data, and thereby supplying the result thus added to said memory means for updating said (x,y) coordinate data.

18. An apparatus according to claim 16, wherein said selecting means comprises a multiplexer.

19. An apparatus according to claim 17, wherein said memory means comprises said flip-flop.

* * * * *